March 11, 1969      W. A. YONKERS      3,431,811

MOUNTING AND SEALING NUT

Filed Dec. 6, 1966

INVENTOR
WILLIAM A. YONKERS

BY
Rudolph J. Jurick
ATTORNEY

United States Patent Office 3,431,811
Patented Mar. 11, 1969

3,431,811
MOUNTING AND SEALING NUT
William A. Yonkers, Mountain Lakes, N.J., assignor to R F L Industries, Inc., Boonton, N.J., a corporation of New Jersey
Filed Dec. 6, 1966, Ser. No. 599,583
U.S. Cl. 85—32                    4 Claims
Int. Cl. F16b 37/00, 27/00, 37/14

This invention relates to an improved construction of a mounting and sealing nut of the class used for mounting electrical components of a panel.

Numerous electrical components include a threaded shank for panel mounting thereof. The shank passes through a hole formed in the panel and the component is secured to the panel by inner and outer nuts threaded onto the shank. When the component includes an operating rod, lever or the like, movable relative to the shank, it often is desirable to provide means to prevent the penetration of moisture, grit, etc., into the component through the normally open end of the shank. Such means comprises a flexible boot, or sleeve, secured to the outer mounting nut, which sleeve either closes the end of the component shank, or snugly embraces a projecting portion of an operating lever or rod.

This invention is directed to a novel arrangement for securing the flexible sleeve to the mounting nut, which arrangement includes a floating clamping ring. The configurations of the nut, sleeve and ring are such that the clamping pressure applied to the sleeve increases with increased tension applied to the sleeve, thereby eliminating the possibility of the sleeve separating from the nut.

An object of this invention is the provision of a mounting and sealing nut of improved construction.

An object of this invention is the provision of a nut for mounting an electrical component on a panel, said nut having a flexible sealing sleeve attached thereto by means including a floating clamping ring.

An object of this invention is the provision of a mounting nut having an annular groove formed thereon, a flexible sleeve having a base portion which includes an inwardly-directed flange extending into the groove, and a clamping ring encircling the base portion of the sleeve, said clamping ring having a radial portion embedded in the sleeve.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
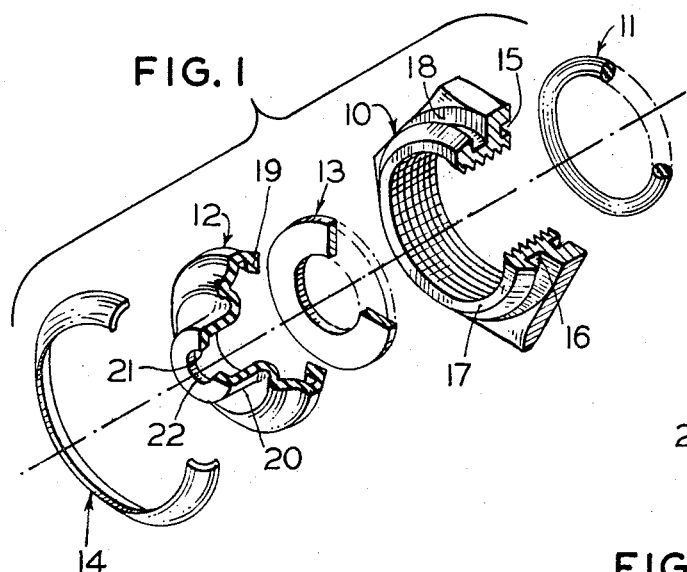
FIGURE 1 is an exploded isometric view showing the components of a mounting nut made in accordance with one embodiment of this invention, each component being cut through to show the configuration thereof.

Referring now to FIGURE 1, a nut made in accordance with one embodiment of this invention comprises the metal nut 10, on O-ring 11 made of a resilient material, a flexible sleeve 12, a sleeve shield 13 made of plastic, and a metal clamping ring 14. Formed in the bottom face of the nut is a circular groove 15 for receiving the O-ring, see FIGURE 2, the depth of the groove being less than the diameter of the O-ring so that a portion of the latter normally projects beyond the bottom face of the nut. A second circular groove 16 is formed in the body of the nut, thereby providing the circular lip 17 and an intermediate face 18. The peripheral surface of the lip is of conical configuration.

The flexible sleeve 12 is molded of rubber or a resilient plastic, the base portion thereof including an inwardly directed circular flange 19. The body portion of the sleeve is relatively thin, of bellows-like configuration, and includes an axially-extended portion 20 terminating in an inwardly-directed lip portion 21 defining the axial hole 22. The mold is made in such manner that the base portion of the sleeve normally is bowed inwardly, as shown.

Figure 2:
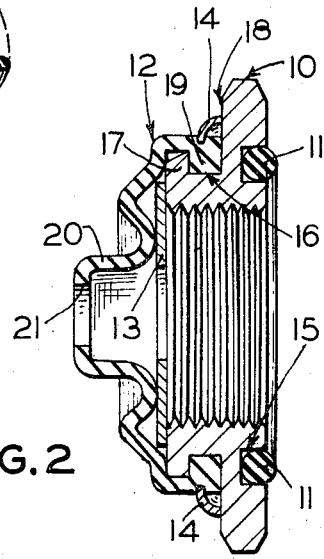
FIGURE 2 is an enlarged, central cross-sectional view of the assembled nut.

The nut is assembled by first inserting the sleeve shield 13 into the sleeve and then pressing the sleeve base portion over the lip 17 of the nut until the inwardly-directed flange 19 snaps into the circular groove 16. The clamping ring 14 is then pressed over the sleeve and into engagement with the intermediate face 18 of the nut. It is here pointed out that the clamping ring has a relatively thin wall and an arcuate cross-sectional configuration, the inner and outer arcuate surfaces of the ring being substantially concentric and having an angular extent of substantially 90 degrees. Thus. the inner, end surface of the ring is defined by a cylinder concentric with the ring axis, whereas the outer end surface lies in a plane normal to such axis. The inner end surface of the ring has a diameter slightly smaller than the outside diameter of the sleeve, when the sleeve is positioned over the nut, as shown in FIGURE 2. In such arrangement, only a small force is required to insert the clamping ring into position and such operation is performed by hand. When the ring is in place, its inner end surface is slightly embedded in the flexible shield. The O-ring 11 is inserted into the groove 15 and is retained in place either by means of a suitable cement or by means of a force fit.

Since the clamping ring is a closed, solid ring, there is no possibility of the flange 19, of the flexible sleeve, being pulled radially out of the groove 16. In the case of axial tension applied to the sleeve, as by pulling the sleeve portion 20 away from the nut, that portion of the sleeve which encircles the nut lip 17 will first be deformed into engagement with the conical surface of the lip and then stretched. Such combined deformation and stretching action results in an axial displacement of the clamping ring. However, since the radial portion of the clamping ring is embedded in the sleeve along a plane spaced from the bottom radial wall of the lip 17, such axial displacement of the clamping ring reduces the generally radial distance between the proximate edges of the ring and the lip. This reduces the area through which the sleeve flange must pass in order for the sleeve to become separated from the nut. Also, by reason of the conical peripheral surface of the lip 17, the tension force effective upon the flange 19 is in a direction which minimizes the possibility of the flange being pulled out of the groove without axial displacement of the clamping ring. In effect, then, the axial displacement of the clamping ring increases the clamping pressure applied to the sleeve. In the described arrangement, forces sufficient to tear or otherwise destroy the sleeve may be applied thereto without separation of the sleeve from the nut.

Figure 3:
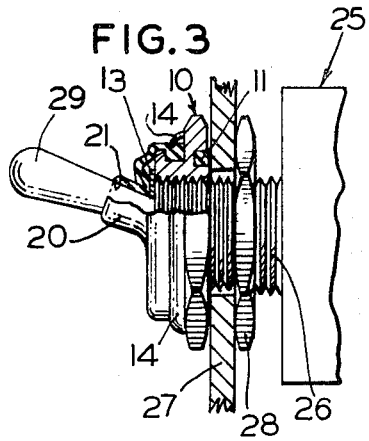
FIGURE 3 is a side elevational view showing a toggle type switch secured to a panel by means of the nut shown in FIGURE 2, with parts broken away and parts in cross-section.

The nut shown in FIGURE 2 is adapted for use with a toggle type switch 25 as shown in FIGURE 3. Such switch includes an externally-threaded shank 26 extending through a hole formed in a panel 27. An inner nut 28 is threaded onto the shank to an extent such that a predetermined portion of the shank extends beyond the panel. The switch lever 29 is passed through the nut 10 and the axially-extended portion 20 of the flexible sleeve after which the nut is threaded tightly onto the shank of the switch. The O-ring 11 is compressed, thereby providing a seal between the bottom surface of the nut and the panel, and the lip 21, of the flexible sleeve, grips the lever 29, thereby providing a seal between the lever and the interior of the switch shank 26. The sleeve shield 13 serves to prevent pinching of the flexible sleeve in the space between the lever and the end of the sank 26 as the sleeve is flexed upon movement of the lever in one or the other direction.

Figure 4:
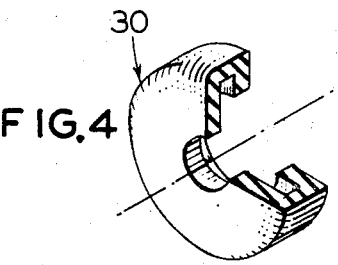
FIGURE 4 is a fragmentary, isometric view showing a flexible sleeve having a different configuration.
Figure 5:
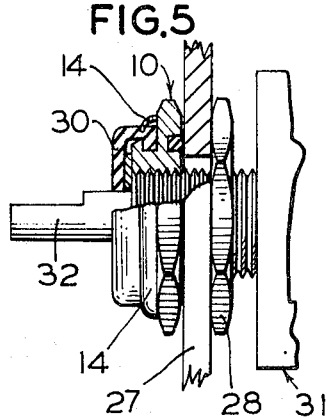
FIGURE 5 is similar to FIGURE 3 and showing the application of a nut having the sleeve shown in FIGURE 4.

The flexible sleeve may take various forms depending upon specific applications of the nut. FIGURE 4 shows a flexible sleeve 30 having a substantially flat bottom with an axial hole formed therein. The base portion of this sleeve is the same as that of the sleeve 12 shown in FIGURE 1 and is secured to the nut by means of the described clamping ring. As shown in FIGURE 5, a nut having the sleeve 30, constitutes the outer mounting nut for a potentiometer 31 having a rotatable operating shaft 32. The axial hole in the sleeve has a diameter substantially smaller than that of the operating shaft, thereby to provide a tight seal between these members. Since the sleeve 30 does not have the bellows-type configuration, the sleeve shield 13 (FIGURE 2) is not required.

Figure 6:
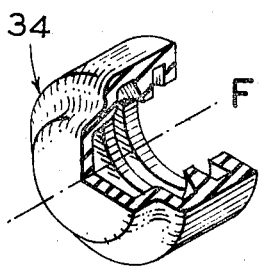
FIGURE 6 is similar to FIGURE 4 but showing a flexible sleeve of still another configuration.
Figure 7:
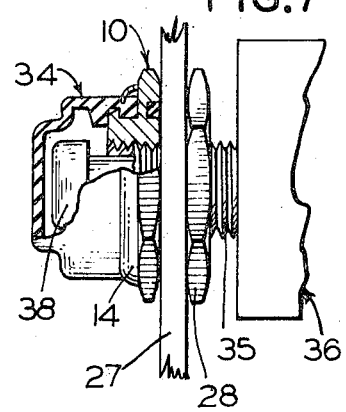
FIGURE 7 is similar to FIGURE 3 but showing the application of a nut having the flexible sleeve shown in FIGURE 6.

In the case of a push button switch, the flexible sleeve has the configuration of the sleeve 34 shown in FIGURES 6 and 7 in order to provide flexibility in the axial direction. Again, the sleeve 34 has a base portion of the same configuration as the two previously described seleeves and is secured to the nut by means of the clamping ring 14, as described. Such sleeve seals the end of the shank 35 of the switch 36 having a push button 38.

Having now described the invention and its advantages, those skilled in this art will be able to make various changes and modifications without thereby departing from the spirit and scope of the invention as recited in the following claims.

I claim:
1. A mounting and sealing device comprising,
    (a) a nut having parallel front, intermediate and rear faces,
    (b) a radial lip formed at the front face of the nut, said lip having an outside diameter less than that of the said intermediate face,
    (c) a continuous peripheral groove formed in the nut, one side wall of the groove being defined by the inner surface of said lip, and the other side wall of the groove being an extension of said intermediate face,
    (d) a flexible sleeve covering the front face of the nut, said sleeve having an inwardly-directed flange disposed in the said groove, and
    (e) a circumferentially continuous clamping ring positioned over said sleeve, said ring having an arcuate cross-sectional configuration extending over an arc of substantially ninety degrees, one end edge of the ring facing the intermediate face of the nut and the other end edge of the ring being embedded in the sleeve between the said lip and intermediate face of the nut.

2. The invention as recited in claim 1 wherein the peripheral surface of said lip is conical and wherein the end surface of the clamping ring embedded in the sleeve lies in a plane substantially normal to the axis of the nut and spaced inwardly from the inner surface of the said lip.

3. The invention as recited in claim 2 wherein the said sleeve has an extended tubular section substantially concentric with the nut avis and a bellows-like central section, and including a washer-like member disposed between the said tubular section and the said lip.

4. The invention as recited in claim 2 including a second continuous groove formed in the rear face of the nut, and a compressible member disposed in said second groove and projecting outwardly therefrom.

References Cited
UNITED STATES PATENTS

| | | | |
|---|---|---|---|
| 2,462,023 | 2/1949 | Johanson et al. | 85—32 |
| 2,968,840 | 1/1961 | Morse | 85—32 |
| 3,061,043 | 10/1962 | Malloy | 285—242 |
| 2,795,144 | 6/1957 | Morse | 85—35 |

FOREIGN PATENTS

| | | |
|---|---|---|
| 784,239 | 4/1935 | France. |
| 835,381 | 3/1952 | Germany. |

EDWARD C. ALLEN, *Primary Examiner.*

U.S. Cl. X.R.

85—35; 74—17.8, 18.1